May 1, 1962  L. KOPITO  3,031,928
CONTROL OF FLEXIBLE SURFACES BY MEANS OF A PROBE
Filed Feb. 13, 1959  2 Sheets-Sheet 2
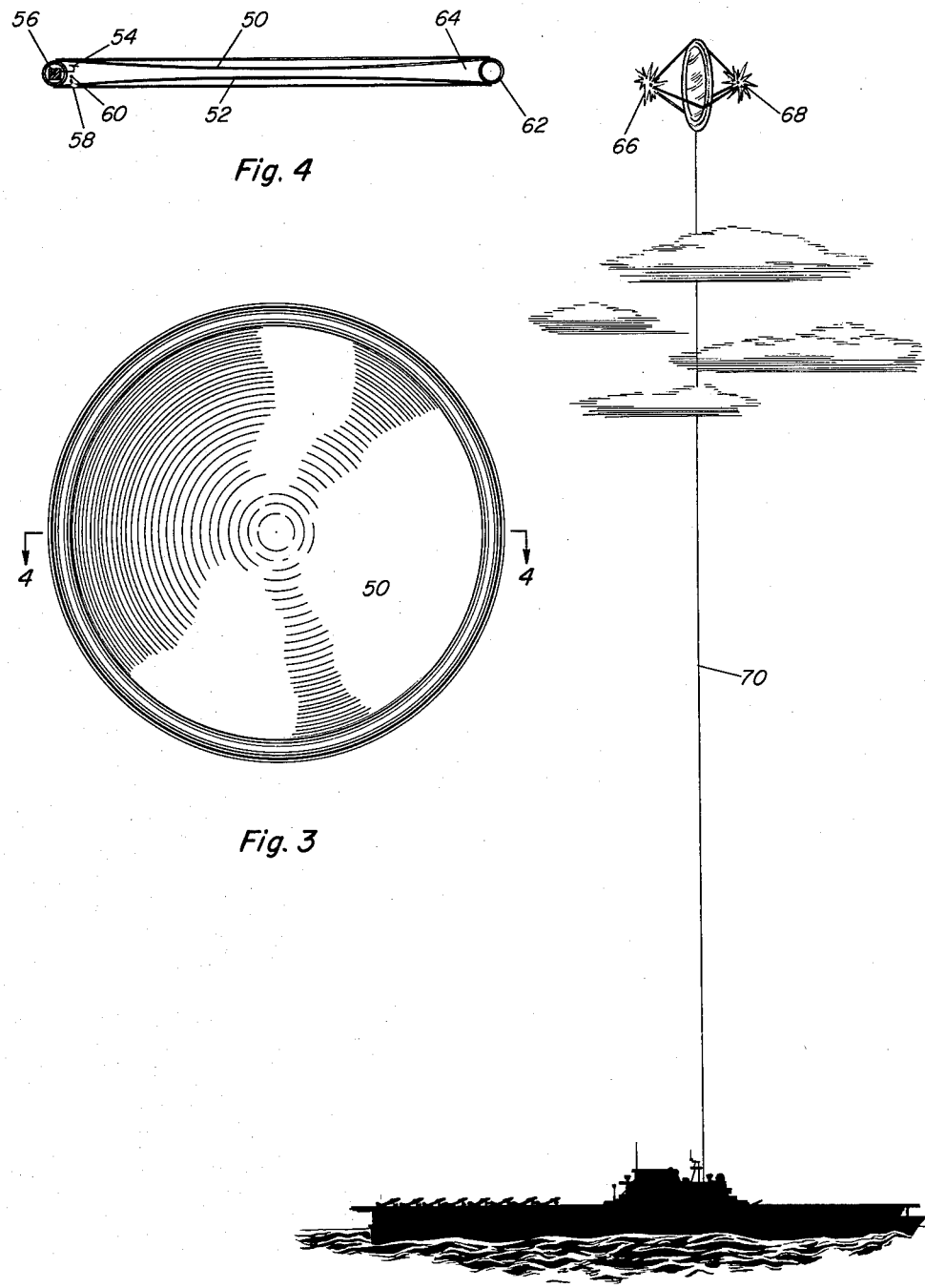

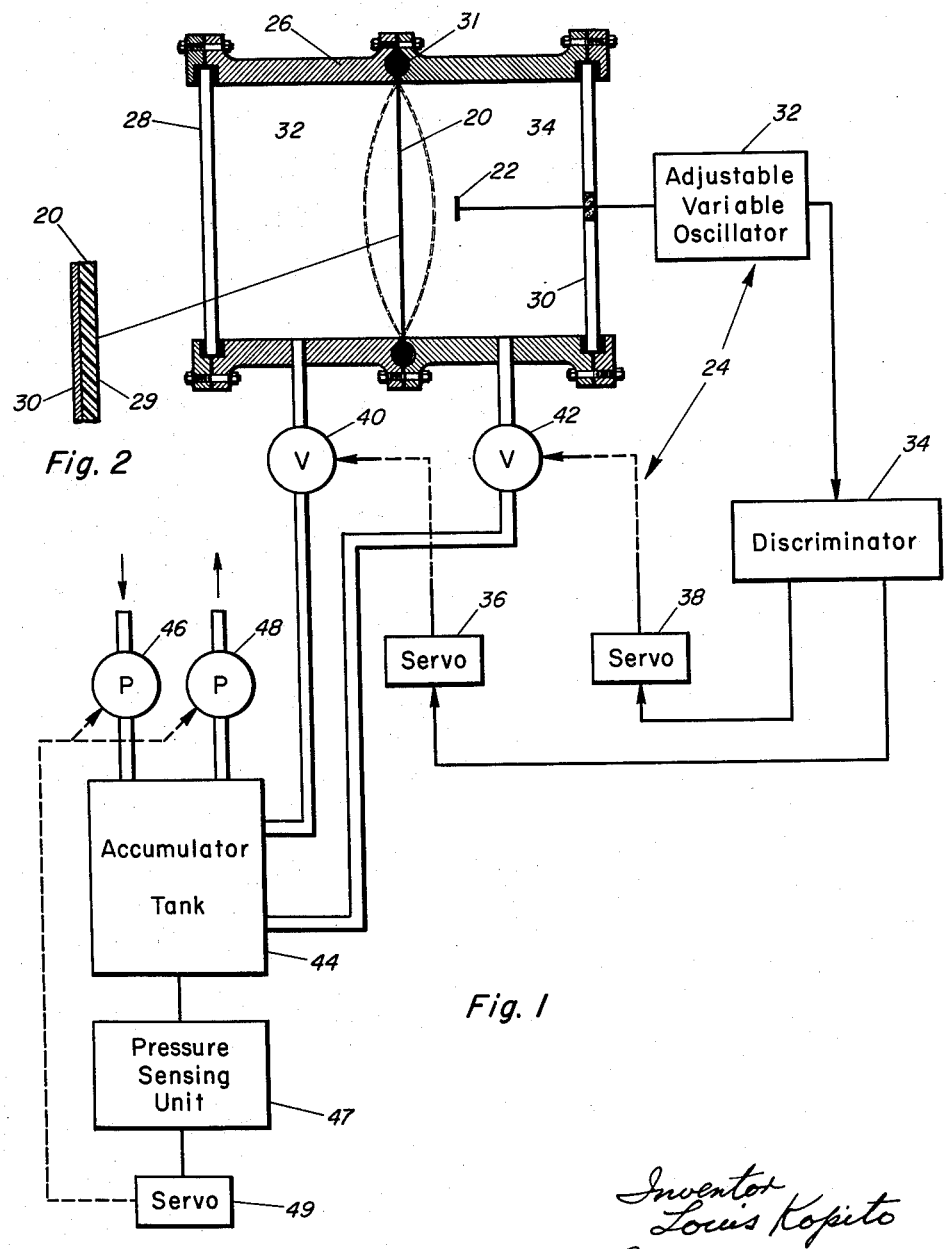

__3,031,928__
__CONTROL OF FLEXIBLE SURFACES BY MEANS OF A PROBE__
Louis Kopito, Brookline, Mass., assignor to Baird-Atomic, Inc., Cambridge, Mass., a corporation of Massachusetts
Filed Feb. 13, 1959, Ser. No. 793,051
9 Claims. (Cl. 88—74)

The present invention relates to optical systems and, more particularly, to optical surfaces provided by flexible membranes of controlled curvature.

The object of the present invention is to provide an optical construction comprising: (1) a flexible component, which presents an optical surface, at least in part bounding a container of a fluid; (2) a detecting component for determining the curvature of the flexible component in order to generate a signal; and (3) a control component responsive to the signal from the detecting component for determining the pressure of the fluid. The construction is applicable to the design of optical systems that couple unusual size and flexibility with desired precision and convenience.

Other objects of the present invention will in part be obvious and will in part appear hereinafter.

The invention accordingly comprises the device possessing the features, properties and relation of components that are examplified in the following detailed disclosure, the scope of which will be indicated in the appended claims.

For a fuller understanding of the nature and objects of the present invention, reference should be had to the following detailed description taken in connection with the accompanying drawings wherein:

FIGURE 1 illustrates a mirror of variable focal length constructed in accordance with the present invention;

FIG. 2 is a fragmentary sectional view of a component of the mirror of FIG. 1;

FIG. 3 is a plan view of another mirror constructed in accordance with the present invention;

FIG. 4 is a sectional view of the mirror of FIG. 3, the section being taken substantially along the line 4—4; and FIG. 5 is a perspective view of a system embodying the mirror of FIG. 3 in use.

Generally, the illustrated embodiments of the present invention each comprises: a flexible membrane which defines a surface of an optical element at the boundary of a gas filled container; a valve system for determining the pressure of the gas; and a control system responsive to the curvature of the membrane for controlling the operation of the valve system. The optical element may be either a mirror or a lens. In the case of a mirror, the membrane preferable is in the form of an organic polymer of high dimensional stability that has been coated with a suitable metal. The polymer, for example, is a fluorinated hydrocarbon such as polyethylene terephthalate, sold by Du Pont under the tradename Mylar. The metal, which preferably is applied to the polymer by vacuum deposition, may be aluminum, copper, silver, gold or alloys thereof. The fluid to be maintained at predetermined pressure preferably is a gas, for example, an inert gas such as argon, neon or nitrogen. Although the sensing component is shown as a capacitive probe that is dielectrically coupled to the metal coating of a flexible reflector, a variety of other equivalent electronic, optical, mechanical, hydraulic and pneumatic elements may be employed similarly.

Generally, the optical system of FIGS. 1 and 2 includes an optical element 20 of variable focal length, a sensing probe 22 for producing signals in response to the curvature of optical element 20 and a control system 24 for determining the curvature of optical element 20 in response to a signal from sensing probe 22.

As shown, optical element 20 is mounted within a housing 26 in the form of a two part opaque cylindrical body, at the opposite ends of which are clamped flat plates 28 and 30. Plate 28 is in the form of transparent optically ground glass and plate 30 is opaque. Secured at the adjacent rims of the two parts of body 26, in contact with an O-ring 31, is membrane 20, which has as laminated strata a polymeric base 29 and a metallic coating 30 of the types described above. Membrane 20 divides the chamber within housing 26 into two compartments 32 and 34. It is apparent that the curvature of membrane 20 is determined by the relative pressures of the gasses in compartments 32 and 34.

Sensing probe 22 is in the form of a metallic element which capacitively communicates with stratum 30 of membrane 20. The capacitor constituted by probe 22 and stratum 20 is part of the tank circuit of a variable oscillator 32, which generates signals for transmission to the remainder of control system 24 now to be described. Control system 24 includes in addition to variable oscillator 32, a discriminator 34 which provides a direct current output, that is a function of the frequency generated by variable oscillator 32, and a pair of servos 36 and 38 that respond oppositely to the direct current output of discriminator 34. Communicating with chambers 32 and 34 are a pair of valves 40 and 42, which in turn communicate with an accumulator tank 44. Tank 44 is maintained at a constant pressure by input and output pumps 46 and 48 that operate continuously at speeds controlled by a pressure sensing unit 47 and a servo 49. Valves 40 and 42 serve to increase or decrease the pressure of the gasses in the chambers with which they are associated by opening intermittently under the mechanical control of servos 36 and 38. It is apparent that the curvature of membrane 20 may be adjusted by setting discriminator 34 and may be maintained, notwithstanding fluctuations in ambient conditions, by control system 24.

Generally, the optical system of FIGS. 3, 4 and 5 includes optical elements 50 and 52 of variable focal length, a sensing probe 54 for producing signals in response to the curvature of one of optical elements 50 and 52 and a control system 56 for determining the curvature of optical elements 50 and 52 by controlling the input and output of gas through a pair of vents 58 and 60. As shown optical element includes a housing 62 in the form of a flexible toroidal tube filled with a lighter than air gas such as hydrogen or helium. Optical elements 50 and 52 which are similar in construction to optical element 20 (FIG. 1) and housing 62 bound a hermetic chamber 64. The pressure within chamber 64 is maintained by control system 56 in the manner described in reference to that of control system 24 (FIG. 1). In operation the system of FIGS. 3 and 4, when provided with suitable illumination sources 66 and 68 and anchored by a line or cord 70 to the earth's surface may serve as a large beacon of great height.

Since certain changes may be made in the above device without departing from the scope of the invention herein involved, it is intended that all matter contained in the above description and shown in the accompanying drawings shall be interpreted in an illustrative and not in a limiting sense.

What is claimed is:

1. An optical device comprising a housing containing a cavity, a fluid within said cavity, a flexible membrane constituting at least part of the boundary of said cavity, said flexible membrane presenting at least one optical surface to radiation incident upon said housing, a probe for detecting the curvature of said membrane in order to produce a signal, pressure means communicating with said cavity, and servo means responsive to said signal for controlling the flow of fluid between said pressure means and said cavity.

2. The optical device of claim 1 wherein said membrane includes, as laminated strata, an organic polymer and a metal.

3. The optical device of claim 1 wherein said membrane includes, as laminated strata, an organic polymer, composed of polyethylene terephthalate, and a metal.

4. An optical device comprising a housing containing a cavity, a fluid within said cavity, a flexible membrane defining at least part of the boundary of said cavity, said flexible membrane presenting at least one optical surface to radiation incident upon said housing, a probe for detecting the curvature of said membrane in order to produce a signal, pressure means communicating with said cavity, and servo means responsive to said signal for controlling the flow of fluid between said pressure means and said cavity, said flexible membrane constituting a mirror and said fluid constituting a gas.

5. The optical device of claim 4 wherein said membrane includes, as laminated strata, an organic polymer and a metal.

6. An optical device comprising a housing containing a cavity, a fluid within said cavity, a flexible membrane constituting at least part of the boundary of said cavity, said flexible membrane presenting at least one metallic optical surface to radiation incident upon said housing, a probe adjacent to said membrane for detecting the curvature of said membrane in order to produce an electrical signal, pressure means containing fluid and communicating with said cavity, and servo means responsive to said signal for controlling the communication between said pressure means and said cavity, said probe constituting one of the superposed conductors of a capacitor, said one metallic optical surface constituting the other of the superposed conductors of a capacitor, said signal being an alternating current between said superposed conductors, said capacitor controlling the frequency of said alternating current.

7. An optical device comprising a housing containing a cavity, a flexible mirror within said cavity defining, in conjunction with said housing, two chambers, a gas within each chamber, said housing providing a window for at least one of said chambers, a probe for detecting the curvature of said flexible mirror in order to produce a signal, an accumulator tank, input and output pumps for maintaining a steady pressure in said accumulator tank, valves respectively communicating between said chambers and said accumulator tank, and control means responsive to said signal in order to intermittently connect said valves between said accumulator tank and said two chambers.

8. The optical device of claim 7 wherein said membrane includes, as laminated strata, an organic polymer and a metal.

9. The optical device of claim 7 wherein said membrane includes, a laminated strata, an organic polymer composed of a fluorinated hydrocarbon and a metal.

References Cited in the file of this patent
UNITED STATES PATENTS

| | | |
|---|---|---|
| 504,890 | Ohmart | Sept. 12, 1893 |
| 2,567,253 | Strange et al. | Sept. 11, 1951 |
| 2,656,722 | Mansfield et al. | Oct. 27, 1953 |
| 2,798,478 | Tarcici | July 9, 1957 |
| 2,808,545 | Hirtreiter et al. | Oct. 1, 1957 |
| 2,829,520 | Stanton | Apr. 8, 1958 |
| 2,952,189 | Pajes | Sept. 13, 1960 |